United States Patent
Ranta-Aho et al.

(10) Patent No.: US 8,526,324 B2
(45) Date of Patent: Sep. 3, 2013

(54) METHOD OF CONTROLLING RADIO RESOURCES, AND RADIO SYSTEM

(75) Inventors: Karri Ranta-Aho, Espoo (FI); Antti Toskala, Espoo (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

(21) Appl. No.: 13/480,551

(22) Filed: May 25, 2012

(65) Prior Publication Data

US 2012/0236747 A1 Sep. 20, 2012

Related U.S. Application Data

(63) Continuation of application No. 11/976,431, filed on Oct. 24, 2007, now Pat. No. 8,199,660.

(30) Foreign Application Priority Data

Oct. 25, 2006 (FI) ...................... 20065676

(51) Int. Cl.
*H04L 12/26* (2006.01)
*H04W 24/02* (2009.01)

(52) U.S. Cl.
USPC .......................... 370/252; 370/335

(58) Field of Classification Search
None
See application file for complete search history.

(56) References Cited

U.S. PATENT DOCUMENTS

| 7,672,263 | B2 | 3/2010 | Sinivaara |
| 2005/0163072 | A1 | 7/2005 | Park et al. |
| 2006/0256757 | A1 | 11/2006 | Kuusela et al. |
| 2006/0268789 | A1 | 11/2006 | Yu et al. |
| 2006/0285558 | A1 | 12/2006 | Dottling et al. |
| 2007/0015529 | A1 | 1/2007 | Choi et al. |
| 2007/0030828 | A1 | 2/2007 | Vimpari et al. |
| 2007/0189237 | A1 | 8/2007 | Jaatinen et al. |
| 2007/0264939 | A1 | 11/2007 | Sugar |
| 2007/0293162 | A1 | 12/2007 | Jaatinen et al. |
| 2008/0043681 | A1* | 2/2008 | Vimpari et al. ............... 370/335 |
| 2008/0049683 | A1 | 2/2008 | Nakamata et al. |

OTHER PUBLICATIONS

3GPP TR 25.903 V0.2.0 (Nov. 2005), Technical Report, 3rd Generation Partnership Project; Technical Specification Group Radio Access Network; Continuous Connectivity for Packet Data Users; (Release 7), pp. 1-36.

* cited by examiner

*Primary Examiner* — Min Jung
(74) *Attorney, Agent, or Firm* — Winstead PC (57) ABSTRACT

There is provided a radio system, comprising: a receiver for receiving uplink channel traffic; a measuring unit for measuring periodicity of the received uplink channel traffic; and a control unit for controlling discontinuous uplink operation on the basis of the measured periodicity of the received uplink channel traffic.

25 Claims, 4 Drawing Sheets

METHOD OF CONTROLLING RADIO RESOURCES, AND RADIO SYSTEM

This application is a continuation of U.S. patent application Ser. No. 11/976,431, filed Oct. 24, 2007, which claims the benefit of Finland Application Number 20065676, filed Oct. 25, 2006.

FIELD

The invention relates to a method of controlling radio resources, to a radio system, to a radio network controller, to a base station, to a control module, and to a computer-readable distribution medium having computer executable components for executing a computer process for controlling radio resources.

BACKGROUND

High Speed Uplink Packet Access (HSUPA) is a packet-based data service in a WCDMA (Wideband Code Division Multiple Access) uplink with a typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an E-DPDCH (Enhanced Dedicated Physical Data Channel), implemented on top of WCDMA uplink physical data channels, such as a DPCCH (Dedicated Physical Control Channel) and a DPDCH (Dedicated Physical Data Channel), thus sharing radio resources with the WCDMA uplink physical data channels. Physical L1 (Layer 1) control information is carried on an E-DPCCH that is code multiplexed with the E-DPDCH channels.

Discontinuous uplink transmission operation (uplink gating) is well suited for services like voice over IP (VoIP) having a periodic data source, such as a speech encoder producing a speech frame every 20 ms (AMR). With IP (Internet protocol) based services, a session is configured at a layer above radio (session initiation protocol, SIP, being used), so it is not known in a radio network controller (RNC) or in node B that a PS (packet switched) domain service is VoIP or any other service with periodic transmission of packets, such as push to talk over cellular (PoC). This is even more the case when using $3^{rd}$ party clients like Skype, which hide the type of data actually being transmitted. This makes it difficult to determine which users could be using discontinuous uplink without their service quality being impacted.

An activated uplink gating pattern gives best gains when the uplink activity needed for maintaining the link can be synchronized with the activity of the data source. Because other periodic traffic sources, such as VoIP, can also be introduced, the only usable pattern cannot be optimized solely for VoIP use (such as PS Video). However, currently periodic traffic is treated like any other packet data stream. Uplink gating is described in $3^{rd}$ Generation Partnership Project; TR 25.903, V0.2.0 (2005-11).

Therefore, a need exists to consider improvements for the radio resource control in an HSUPA system.

BRIEF DESCRIPTION OF THE INVENTION

An object of the invention is to provide an improved method of controlling radio resources, an improved radio system, an improved radio network controller, an improved base station, an improved control module, and an improved computer-readable distribution medium.

According to an aspect of the invention, there is provided a method of controlling radio resources. The method comprises: receiving uplink channel traffic; measuring periodicity of the received uplink channel traffic; and controlling discontinuous uplink operation on the basis of the measured periodicity of the received uplink channel traffic.

According to another aspect of the invention, there is provided a radio system, comprising: a receiver for receiving uplink channel traffic; a measuring unit for measuring periodicity of the received uplink channel traffic; and a control unit for controlling discontinuous uplink operation on the basis of the measured periodicity of the received uplink channel traffic.

According to another aspect of the invention, there is provided a radio network controller, comprising: a receiver for receiving information related to measured periodicity of received uplink channel traffic; and a control unit for controlling discontinuous uplink operation on the basis of the received information.

According to another aspect of the invention, there is provided a base station, comprising: a receiver for receiving uplink channel traffic; a measuring unit for measuring periodicity of the received uplink channel traffic; and a transmitter for sending information related to the measured periodicity of the received uplink channel traffic for enabling discontinuous uplink operation to be controlled on the basis of the measured periodicity of the received uplink channel traffic.

According to another aspect of the invention, there is provided a control module, comprising: a measuring unit for measuring periodicity of received uplink channel traffic; and a control unit for controlling discontinuous uplink operation on the basis of the measured periodicity of the received uplink channel traffic.

According to another aspect of the invention, there is provided a computer-readable distribution medium having computer executable components for executing a computer process for controlling radio resources. The process comprises: receiving uplink channel traffic; measuring periodicity of the received uplink channel traffic; and controlling discontinuous uplink operation on the basis of the measured periodicity of the received uplink channel traffic.

According to another aspect of the invention, there is provided a radio system, comprising: receiver means for receiving uplink channel traffic; measuring means for measuring periodicity of the received uplink channel traffic; and processing means for controlling discontinuous uplink operation on the basis of the measured periodicity of the received uplink channel traffic.

According to another aspect of the invention, there is provided a radio network controller, comprising: receiver means for receiving information related to measured periodicity of received uplink channel traffic; and processing means for controlling discontinuous uplink operation on the basis of the received information.

According to another aspect of the invention, there is provided a base station, comprising: receiver means for receiving uplink channel traffic; measuring means for measuring periodicity of the received uplink channel traffic; and transmitter means for sending information related to the measured periodicity of the received uplink channel traffic for enabling discontinuous uplink operation to be controlled on the basis of the measured periodicity of the received uplink channel traffic.

According to another aspect of the invention, there is provided a control module, comprising: measuring means for measuring periodicity of received uplink channel traffic; and processing means for controlling discontinuous uplink operation on the basis of the measured periodicity of the received uplink channel traffic.

The invention provides several advantages.

In an embodiment of the invention, determining which users should use discontinuous uplink operation is enabled. Performance gain from gating can be maximized. Extra delays can be minimized or even fully avoided.

LIST OF DRAWINGS

In the following, the invention will be described in greater detail with reference to the embodiments and the accompanying drawings, in which.

DESCRIPTION OF EMBODIMENTS

Figure 1:
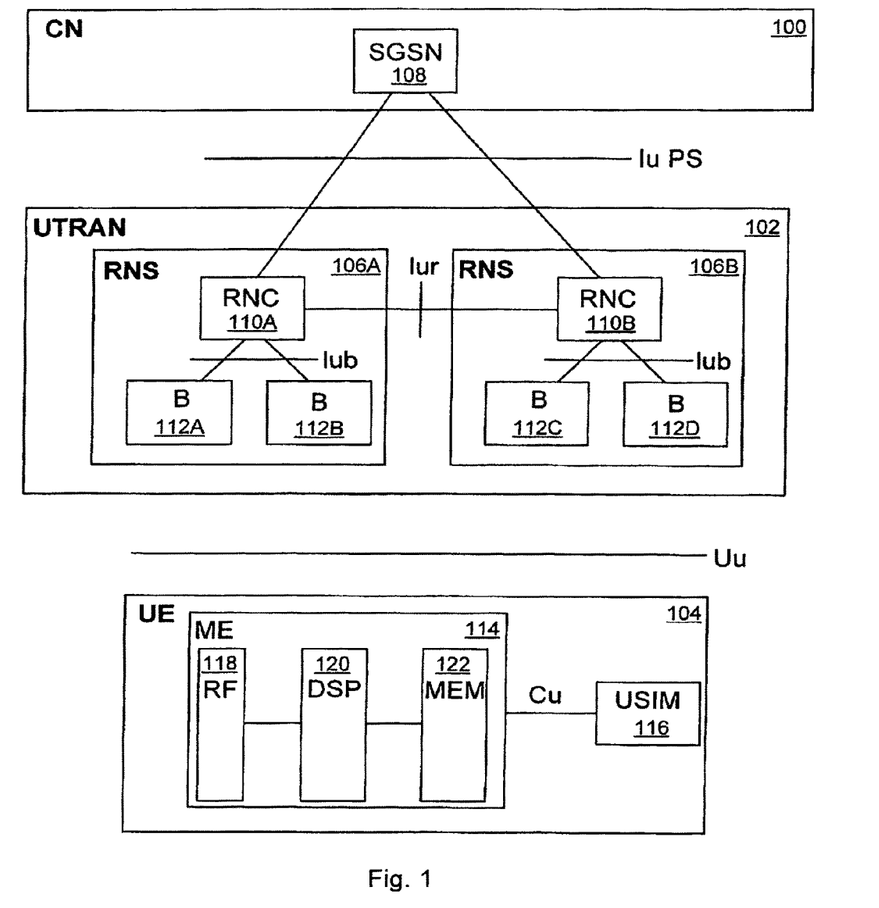
FIG. 1 shows an example of a radio system.

FIG. 1 illustrates an example of a radio system to which the present solution may be applied. Below, embodiments of the invention will be described using the UMTS (Universal Mobile Telecommunications System) as an example of the wireless telecommunications system. The invention may, however, be applied to any wireless telecommunications system that supports HSUPA protocol elements, such as HARQ (Hybrid Automatic Retransmission Request) and Node B scheduling. The structure and the functions of such a wireless telecommunications system and those of the associated network elements are only described when relevant to the invention.

The wireless telecommunications system may be divided into a core network (CN) 100, a UMTS terrestrial radio access network (UTRAN) 102, and user equipment (UE) 104. The core network 100 and the UTRAN 102 form a network infrastructure of the wireless telecommunications system.

The UTRAN 102 is typically implemented with wideband code division multiple access (WCDMA) radio access technology.

The core network 100 includes a serving GPRS support node (SGSN) 108 connected to the UTRAN 102 over an Iu PS interface. The SGSN 108 represents the center point of the packet-switched domain of the core network 100. The main task of the SGSN 108 is to transmit packets to the user equipment 104 and to receive packets from the user equipment 104 by using the UTRAN 102. The SGSN 108 may contain subscriber and location information related to the user equipment 104.

The UTRAN 102 includes radio network sub-systems (RNS) 106A, 106B, each of which includes at least one radio network controller (RNC) 110A, 110B and nodes B 112A, 112B, 112C, 112D.

Some functions of the radio network controller 110A, 110B may be implemented with a digital signal processor, memory, and computer programs for executing computer processes. The basic structure and the operation of the radio network controller 110A, 110B are known to one skilled in the art, and only the details relevant to the present solution are discussed in detail.

The node B 112A, 112B, 112C, 112D implements a Uu interface, through which the user equipment 104 may access the network infrastructure. Some functions of the base station 112A, 112B, 112C, 112D may be implemented with a digital signal processor, memory, and computer programs for executing computer processes. The basic structure and operation of the base station 112A, 112B, 112C, 112D are known to one skilled in the art and only the details relevant to the present solution are discussed in detail.

The user equipment 104 may include two parts: mobile equipment (ME) 114 and a UMTS subscriber identity module (USIM) 116. The mobile equipment 114 typically includes radio frequency parts (RF) 118 for providing the Uu interface. The user equipment 104 further includes a digital signal processor 120, memory 122, and computer programs for executing computer processes. The user equipment 104 may further comprise an antenna, a user inter-face, and a battery not shown in FIG. 1.

The USIM 116 comprises user-related information and information related to information security in particular, such as an encryption algorithm. The basic structure and operation of the user equipment 104 are known to one skilled in the art, and only the details relevant to the present solution are discussed in detail.

Figure 2A:
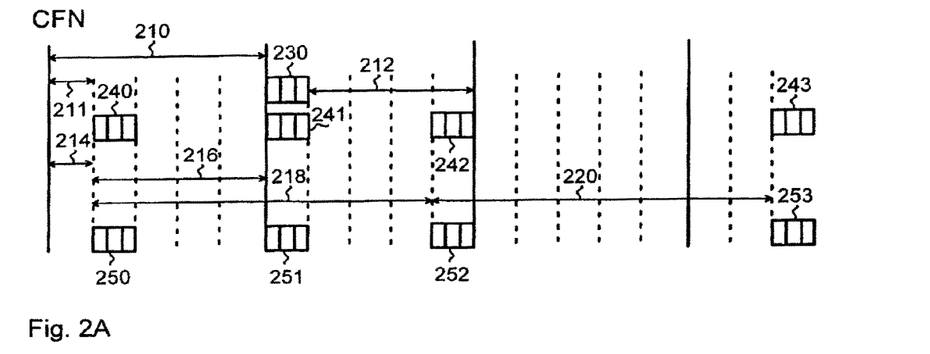
FIGS. 2A and 2B illustrate examples of discontinuous transmission patterns.
Figure 2B:
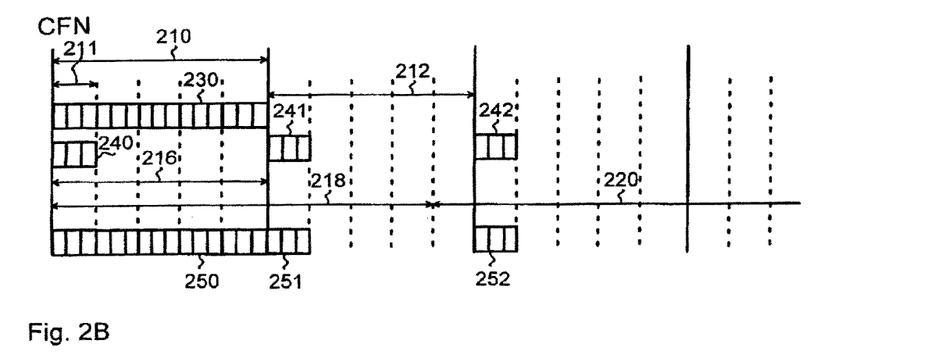

FIGS. 2A and 2B illustrate examples of discontinuous transmission patterns. The example of FIG. 2A shows an example of an uplink DPCCH discontinuous transmission pattern for a 2 ms E-DCH TTI (Transmission Time Interval), and the example of FIG. 2B shows an example of an uplink DPCCH discontinuous transmission pattern for a 10 ms E-DCH TTI. The uplink DPCCH transmission pattern defines the minimum set of slots where the UE shall transmit the UL-DPCCH. Intervals 210 illustrate 10 ms E-DPDCH/E-DPCCH radio frames. Intervals 211 illustrate 2 ms E-DPDCH/E_DPCCH sub-frames. Intervals 216 illustrate a UE discontinuous transmission cycle 1. Intervals 218, 220 illustrate a UE discontinuous transmission cycle 2. Intervals 212 illustrate an inactivity threshold for the UE cycle 2. Interval 214 illustrates a UE discontinuous transmission offset.

Each three-part block 230 to 253 in FIGS. 2A and 2B illustrates 2 ms subframes with transmission. The blocks 230 illustrate E-DCH transmission (2 ms TTI in FIG. 2A, and 10 ms TTI in FIG. 2B). The blocks 240 to 243 illustrate DPCCH transmission patterns, and the blocks 250 to 253 illustrate DPCCH transmission (2 ms E-DCH TTI in FIG. 2A, and 10 ms E-DCH TTI in FIG. 2B).

FIG. 2 illustrates the end result after determining the E-DCH activity pattern and timing, and aligning the DPCCH transmission pattern thereto. Without proper timing information on the E-DCH transmission, alignment of the DPCCH transmission pattern is impossible and thus, the DPCCH needs to be transmitted more frequently: during the DPCCH activity pattern AND during the E-DCH activity.

Figure 3:
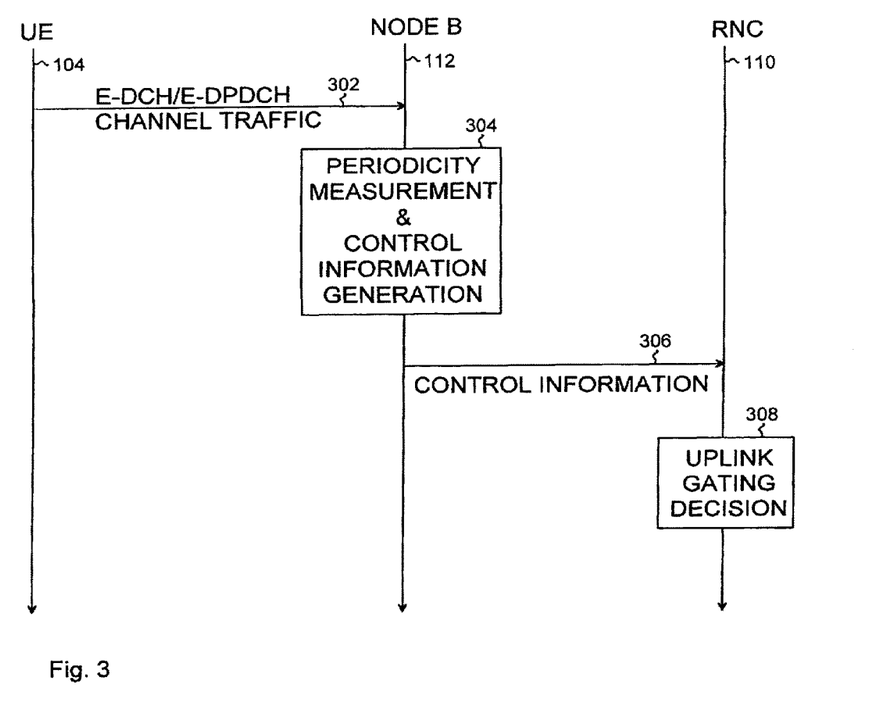
FIG. 3 illustrates an example of physical channels and procedures associated with an embodiment.

FIG. 3 illustrates an example of physical channels and procedures associated with an embodiment. A vertical axis 112 represents the node B of a network infrastructure (NIS), a vertical axis 110 represents the radio network controller (RNC), and a vertical axis 104 represents the user equipment.

The user equipment 104 may be connected to node B 112 over an uplink physical data channel 302, such as an E-DP-DCH (Enhanced Dedicated Physical Data channel), a data channel of the E-DCH, defined in the 3GPP specification. The uplink physical data channel 302 is used for delivering packet traffic from the user equipment 104 to the network infrastructure 112, and it is also typically used for high priority services, such as conversational class speech services and RRC (Radio Resource Control), in relation to the HSUPA data transfer capacity.

High data-rate packet-services on the uplink are provided by a physical HSUPA channel, such as an E-DPDCH (Enhanced Dedicated Physical Data Channel) defined in the 3GPP specification. The E-DPDCH transfers data blocks in predetermined temporal intervals, such as a TTI (Transmission Time Interval). Each data block is received, and a CRC (Cyclic Redundancy Check) procedure, for example, is used to test the success of the reception of the block.

According to an embodiment, node B measures the periodicity of the uplink traffic received (periodicity of the E-DCH), and generates control information on the basis of the measurement 304. The measured periodicity can indicate, for example, a cumulative distribution of the $1^{st}$ transmission instants within a given period of time, such as a 100 ms or a 200 ms window over several seconds. The control information 306 comprising, for example, measurement statistics (distribution) and/or a pattern suggestion with timing details is then transmitted to the RNC 110.

According to an embodiment, the RNC 110 makes a decision about activating a discontinuous uplink operation on the basis of the received measurement statistics and/or pattern suggestion 308. For example, the RNC 110 decides whether or not a discontinuous uplink transmission operation (uplink gating) is to be activated. According to an embodiment, the RNC 110 can reconfigure parameters received with the control information if it is detected that the traffic characteristics change. Thus, node B 112 may continue making the measurements.

Figure 4:
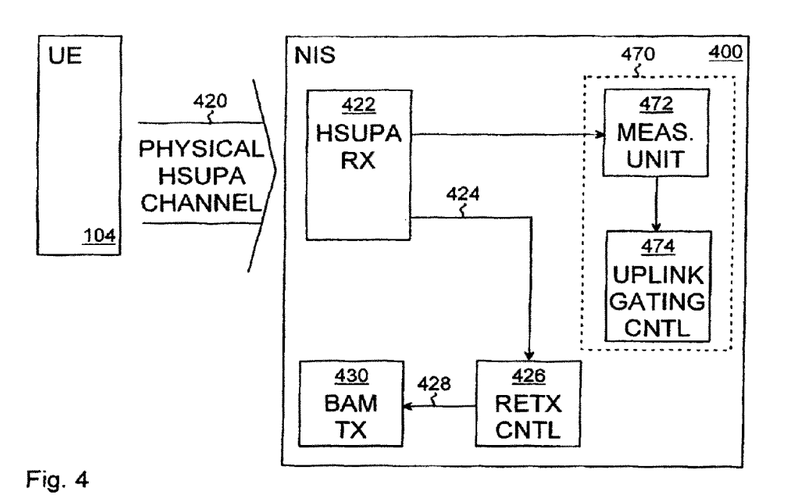
FIG. 4 shows an example of user equipment and a network infrastructure according to an embodiment.

FIG. 4 shows an example of user equipment and a network infrastructure according to an embodiment. User equipment 104 supporting the HSUPA protocol includes an HSUPA channel generator (HSUPA CG) that generates a physical HSUPA channel 420 (E-DPCCH/E-DPDCH) from an HSUPA logical channel, such as an E-DCH (Enhanced Dedicated Channel). An HSUPA receiver (HSUPA RX) 422 located in a network infrastructure 400 receives the physical HSUPA channel 420 transmitted over the radio interface. The HSUPA receiver 422 decodes data blocks transmitted over the physical HSUPA channel 420 and provides an decoding report 424 to a retransmission controller (RETX CNTL) 426. The decoding report 424 typically includes results of the success of the decoding of each data block.

The retransmission controller 426 receives the decoding report 424 and implements parts of an HARQ protocol. The retransmission controller 426 generates a block acknowledgement message 428 for each data block. The acknowledgement message 428 is inputted into a block acknowledgement message transmitter (BAMTX) 430 that transmits a block acknowledgement message to the user equipment 104 over the radio interface.

The user equipment 104 includes a block acknowledgement message receiver for communicating a block acknowledgement message between the user equipment 104 and the network infrastructure 400. The HSUPA channel generator of the user equipment 104 may carry out a retransmission procedure according to the HARQ protocol on the basis of the block acknowledgement message.

In an embodiment, the network infrastructure 400 includes a control module 470 for controlling discontinuous uplink operation. The control module 470 comprises a measuring unit 472 and an uplink gating control unit 474 for controlling discontinuous uplink operation. The measuring unit 472 may reside in a base station of the network infrastructure 400 and the uplink gating control unit 474 may reside in a radio network controller. However, it is also possible that the measuring unit 472 and/or the uplink gating control unit 474 reside in any other parts of the network infrastructure 400. The measuring unit 472 and the uplink gating control unit 474 may be implemented with a microprocessor, a signal processor or separate components and associated software.

In an embodiment, the measuring unit 472 measures periodicity of the received uplink channel traffic, and the uplink gating control unit 474 controls uplink gating on the basis of the measured periodicity of the received uplink channel traffic.

In an embodiment, the measuring unit 472 is configured to determine a cumulative distribution of first transmission instants over a predetermined time period when measuring the periodicity of the received uplink channel traffic.

In an embodiment, the measuring unit 472 is configured to provide measurement statistics related to the measured periodicity of the received uplink channel traffic.

In an embodiment, the measuring unit 472 is configured to provide a transmission pattern and timing information related to the measured periodicity of the received uplink channel traffic.

In an embodiment, the measuring unit 472 is configured to provide a gating pattern and timing information related to the measured periodicity of the received uplink channel traffic.

In an embodiment, the measuring unit 472 is configured to determine an activity pattern of the received uplink channel traffic on the basis of the measured periodicity of the received uplink channel traffic; and to align a transmission pattern to the activity pattern.

In an embodiment, the uplink gating control unit 474 is configured to determine whether or not to activate discontinuous uplink transmission operation on the basis of the measured periodicity of the received uplink channel traffic.

In an embodiment, the uplink gating control unit 474 is configured to control discontinuous uplink operation on the basis of at least one of: measurement statistics, a gating pattern, a transmission pattern, an activity pattern and timing information that are based on the measured periodicity.

In an embodiment, the uplink gating control unit 474 is configured to reconfigure information related to the measured periodicity of received uplink channel traffic when it is detected that the traffic characteristics have changed.

Figure 5:
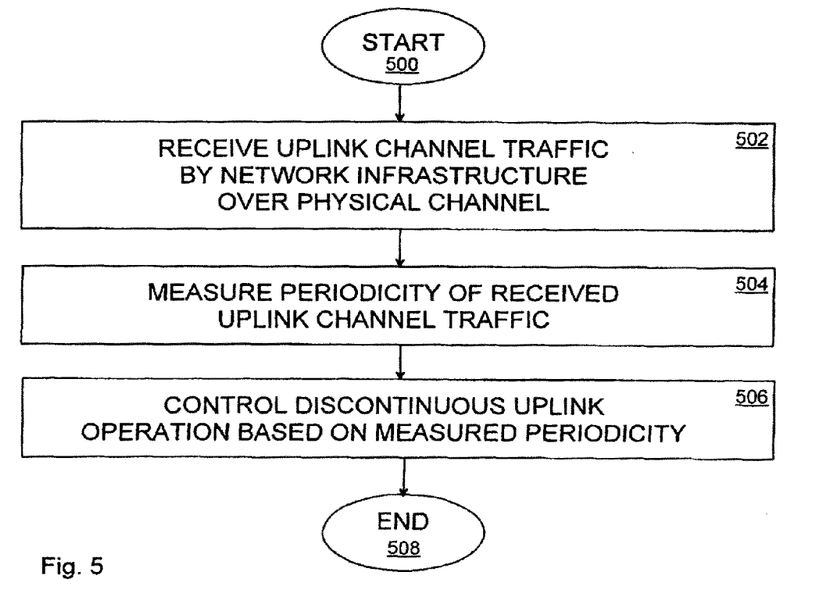
FIG. 5 illustrates a method of controlling radio resources according to an embodiment.

FIG. 5 illustrates a method of controlling radio resources according to an embodiment.

The method starts in 500.

In 502, uplink channel traffic is received by a network infrastructure over a physical channel.

In 504, periodicity of the received uplink channel traffic is measured.

In 506, discontinuous uplink operation decisions are made on the basis of the measured periodicity of the received uplink channel traffic.

The method ends in 508.

Similar information about periodicity could also be collected for the downlink traffic and be used to parameterize the downlink discontinuous operation with High Speed Downlink Packet Access (HSDPA). Downlink traffic is network originated, so information is readily available at the radio network controller to be used for downlink discontinuous operation parameterization for sending data over the downlink physical channels.

The embodiments of the invention may be realized in a radio system comprising a controller. The controller may be configured to perform at least some of the steps described in connection with the flowchart of FIG. 5 and in connection with FIG. 3. The embodiments may be implemented as a computer program comprising instructions for executing a computer process for controlling uplink gating.

The computer program may be stored on a computer-readable distribution medium readable by a computer or a processor. The computer-readable distribution medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method of controlling radio resources, the method comprising:
    receiving uplink channel traffic;
    measuring, by a network, periodicity of the received uplink channel traffic;
    controlling discontinuous uplink operation on the basis of the measured periodicity of the received uplink channel traffic;
    determining an activity pattern of the received uplink channel traffic on the basis of the measured periodicity of the received uplink channel traffic; and
    aligning a transmission pattern to the activity pattern.

2. The method of claim 1, further comprising determining cumulative distribution of first transmission instants over a predetermined time period when measuring the periodicity of the received uplink channel traffic.

3. The method of claim 1, further comprising: providing at least one of measurement statistics, a transmission pattern, a gating pattern, and timing information related to the measured periodicity of the received uplink channel traffic.

4. The method of claim 1, further comprising:
    controlling discontinuous uplink transmission operation on the basis of at least one of measurement statistics, a gating pattern, a transmission pattern, an activity pattern and timing information that are based on the measured periodicity.

5. The method of claim 1, further comprising:
    determining whether or not to activate the discontinuous uplink transmission operation on the basis of the measured periodicity of the received uplink channel traffic.

6. A radio system in a network infrastructure, comprising:
    a receiver configured to receive uplink channel traffic;
    a measuring unit configured to measure periodicity of the received uplink channel traffic;
    a control unit configured to control discontinuous uplink operation on the basis of the measured periodicity of the received uplink channel traffic; and
    wherein the measuring unit is configured to determine an activity pattern of the received uplink channel traffic on the basis of the measured periodicity of the received uplink channel traffic and align a transmission pattern to the activity pattern.

7. The radio system of claim 6, wherein the measuring unit is configured to determine a cumulative distribution of first transmission instants over a predetermined time period when measuring the periodicity of the received uplink channel traffic.

8. The radio system of claim 6, wherein the measuring unit is configured to provide at least one of: measurement statistics, a transmission pattern, a gating pattern, and timing information related to the measured periodicity of the received uplink channel traffic.

9. The radio system of claim 6, wherein the control unit is configured to determine whether or not to activate discontinuous uplink transmission operation on the basis of the measured periodicity of the received uplink channel traffic.

10. An apparatus of a network infrastructure, comprising:
    a receiver configured to receive information related to measured periodicity of received uplink channel traffic, the periodicity measured by a node B;
    a control unit configured to control discontinuous uplink operation on the basis of the received information; and
    a measuring unit configured to determine an activity pattern of the received information on the basis of the measured periodicity of the received uplink channel traffic and align a transmission pattern to the activity pattern.

11. The apparatus of claim 10, wherein the control unit is configured to determine whether or not to activate discontinuous uplink transmission operation on the basis of the measured periodicity of the received uplink channel traffic.

12. The apparatus of claim 10, wherein the control unit is configured to control the discontinuous uplink transmission operation on the basis of at least one of:
    measurement statistics, a gating pattern, a transmission pattern, an activity pattern, and timing information that are based on the measured periodicity.

13. The apparatus of claim 10, wherein the control unit is configured to reconfigure the information related to the measured periodicity of the received uplink channel traffic when it is detected that the traffic characteristics have changed.

14. A base station, comprising:
    a receiver configured to receive uplink channel traffic;
    a measuring unit configured to measure periodicity of the received uplink channel traffic;
    a transmitter configured to send information related to the measured periodicity of the received uplink channel traffic for enabling discontinuous uplink operation to be controlled on the basis of the measured periodicity of the received uplink channel traffic; and
    wherein the measuring unit is configured to determine an activity pattern of the received uplink channel traffic on the basis of the measured periodicity of the received uplink channel traffic and align a transmission pattern to the activity pattern.

15. The base station of claim 14, wherein the measuring unit is configured to determine a cumulative distribution of first transmission instants over a predetermined time period when measuring the periodicity of the received uplink channel traffic.

16. The base station of claim 14, wherein the measuring unit is configured to provide at least one of: measurement statistics, a transmission pattern, a gating pattern, and timing information related to the measured periodicity of the received uplink channel traffic.

17. An apparatus of a network infrastructure, comprising:
    a measuring unit configured to measure periodicity of received uplink channel traffic;
    a control unit configured to control discontinuous uplink operation on the basis of the measured periodicity of the received uplink channel traffic; and wherein the measuring unit is configured to determine an activity pattern of the received uplink channel traffic on the basis of the measured periodicity of the received uplink channel traffic and align a transmission pattern to the activity pattern.

18. The apparatus of claim 17, wherein the measuring unit is configured to determine a cumulative distribution of first transmission instants over a predetermined time period when measuring the periodicity of the received uplink channel traffic.

19. The apparatus of claim 17, wherein the measuring unit is configured to provide at least one of: measurement statistics, a transmission pattern, a gating pattern, and timing information related to the measured periodicity of the received uplink channel traffic.

20. The control module of claim 17, wherein the control unit is configured to determine whether or not to activate discontinuous uplink transmission operation on the basis of the measured periodicity of the received uplink channel traffic.

21. A computer program embodied on a computer-readable medium, the computer program, comprising program code for controlling a processor to execute a method comprising:
  receiving uplink channel traffic;
  measuring, within a network infrastructure, periodicity of the received uplink channel traffic;
  controlling discontinuous uplink operation on the basis of the measured periodicity of the received uplink channel traffic;
  determining an activity pattern of the received uplink channel traffic on the basis of the measured periodicity of the received uplink channel traffic; and
  aligning a transmission pattern to the activity pattern.

22. The computer program of claim 21, wherein the method further comprises controlling discontinuous uplink transmission operation on the basis of at least one of: a measurement statistics, the gating pattern, a transmission pattern, an activity pattern, and timing information that are based on the measured periodicity.

23. The computer program of claim 21, wherein the computer readable medium includes at least one of the following media: a program storage medium, a record medium, a computer readable memory, a computer readable software distribution package, a computer readable signal, a computer readable telecommunications signal, and a computer readable compressed software package.

24. An apparatus of a network infrastructure, comprising:
  receiver means for receiving uplink channel traffic;
  measuring means for measuring periodicity of the received uplink channel traffic; and
  processing means for controlling discontinuous uplink operation on the basis of the measured periodicity of the received uplink channel traffic: and
  wherein the measuring means is configured to determine an activity pattern of the received uplink channel traffic on the basis of the measured periodicity of the received uplink channel traffic and align a transmission pattern to the activity pattern.

25. An apparatus, comprising:
  receiving means for receiving information related to measured periodicity of received uplink channel traffic, the periodicity measured within a network infrastructure;
  controlling means for continuing discontinuous uplink operation on the basis of the received information; and
  measuring means for determining an activity pattern of the received information on the basis of the measured periodicity of the received uplink channel traffic and aligning a transmission pattern to the activity pattern.

* * * * *

UNITED STATES PATENT AND TRADEMARK OFFICE
CERTIFICATE OF CORRECTION

| | | |
|---|---|---|
| PATENT NO. | : 8,526,324 B2 | Page 1 of 1 |
| APPLICATION NO. | : 13/480551 | |
| DATED | : September 3, 2013 | |
| INVENTOR(S) | : Ranta-Aho et al. | |

It is certified that error appears in the above-identified patent and that said Letters Patent is hereby corrected as shown below:

In the Claims

Column 10, Line 18, Claim 24

Replace "traffic: and"
With -- traffic; and --

Signed and Sealed this
Nineteenth Day of November, 2013

Teresa Stanek Rea
*Deputy Director of the United States Patent and Trademark Office*